Patented Aug. 27, 1935

2,012,552

UNITED STATES PATENT OFFICE 2,012,552

BOROSILICATE GLASS COMPOSITION

William C. Taylor, Corning, N. Y., assignor to Corning Glass Works, Corning, N. Y., a corporation of New York No Drawing. Application May 24, 1932, Serial No. 613,339

2 Claims. (Cl. 106—36.1)

This invention relates to glass compositions and more particularly to compositions for borosilicate glasses.

The object of the invention is to produce borosilicate glasses having high chemical stability and high electrical resistivity without producing crystallization.

It is known that the addition of second group elements to borosilicate glasses usually results in increased chemical stability and although certain prior borosilicate glasses have contained appreciable amounts of second group oxides these glasses have also contained a high soda alkali content. High alkali content as is well known tends to decrease chemical stability and electrical resistivity. Considerable alkali was a necessity in such prior glasses because with low alkali content the addition of any considerable amount of second group oxides causes crystallization on working or cooling. Consequently it was not known how to produce borosilicates of low alkali content and low thermal expansion coefficient which would contain large amounts of second group oxides and at the same time would remain free from crystallization on cooling or on being re-worked in the flame. Low alkali borosilicates containing large amounts of second group oxides are particularly useful and desirable in sealing electrodes of tungsten or molybdenum or alloys thereof into glass receptacles wherein chemical stability and low electrical conductivity is required and a definite low expansion coefficient is necessary to match that of the metal electrode.

I have discovered that by substituting potash for a proportion of the soda I can prevent this undesirable crystallization and produce borosilicate glasses containing larger amounts of second group oxides in proportion to the alkali content than have heretofore been possible and at the same time possessing the valuable properties of high chemical stability, low expansion coefficient and freedom from crystallization. In fact I find that I may introduce second group oxides so that they will constitute not less than 10% of the composition of the finished glass.

The following composition which meets these considerations is an example of a glass which I have successfully melted in accordance with my invention.

| | Per cent |
|---|---|
| $SiO_2$ | 72 |
| $Na_2O$ | 6 |
| $K_2O$ | 2 |
| $B_2O_3$ | 8 |
| MgO | 12 |

The above glass has a linear coefficient of expansion of approximately .0000046 as calculated from the composition using the Winkelmann and Schott expansion factors and is a clear glass which may be re-worked in the flame without crystallizing. It also possesses good chemical stability. In general, other second group metals particularly zinc, calcium or barium may be substituted in lieu of magnesium in the above composition without causing crystallization although the expansion coefficient will be subject to a slight change depending on which metal is substituted. The tendency to crystallize is repressed to a greater extent and the second group content may be increased as the ratio $Na_2O$ to $K_2O$ is decreased. Since increase of potash content causes the glass to become increasingly more difficult to melt, the ratio $Na_2O$ to $K_2O$ will depend to some extent upon the character of the glass required. I have found that very satisfactory results are obtained when this ratio is equal to one, that is, when the amount of potash is equal to the amount of soda but I have also found that a ratio as low as $3Na_2O$ to $1K_2O$ is suitable for many purposes as for example in the above recited composition.

What I claim is:—

1. A borosilicate glass having a thermal coefficient of expansion of about .000005 and consisting essentially of silica 72%, magnesia 12%, boric oxide 8%, sodium oxide 6% and potassium oxide 2%.

2. A borosilicate glass which has a coefficient of thermal expansion of about .000005, which will not crystallize upon reheating and which consists of over 70% of silica, not over 8% of alkali of which at least one-third is potash, about 8% of boric oxide and not less than 10% of second group oxides.

WILLIAM C. TAYLOR.